United States Patent
Palomares et al.

(10) Patent No.: US 11,596,139 B2
(45) Date of Patent: Mar. 7, 2023

(54) METHOD FOR AUTONOMOUSLY WEEDING CROPS IN AN AGRICULTURAL FIELD

(71) Applicant: FarmWise Labs, Inc., San Francisco, CA (US)

(72) Inventors: Thomas Palomares, San Francisco, CA (US); Sébastien Boyer, San Francisco, CA (US); Arthur Flajolet, San Francisco, CA (US); Eric Stahl-David, San Francisco, CA (US)

(73) Assignee: FarmWise Labs, Inc., San Francisco, CA (US)

( * ) Notice: Subject to any disclaimer, the term of this patent is extended or adjusted under 35 U.S.C. 154(b) by 727 days.

(21) Appl. No.: 16/570,878

(22) Filed: Sep. 13, 2019

(65) Prior Publication Data

US 2020/0000081 A1    Jan. 2, 2020

Related U.S. Application Data

(63) Continuation of application No. 16/267,362, filed on Feb. 4, 2019, now Pat. No. 10,455,826.

(60) Provisional application No. 62/626,602, filed on Feb. 5, 2018.

(51) Int. Cl.
*A01M 21/02* (2006.01)
*G05D 1/02* (2020.01)
*A01D 34/00* (2006.01)

(52) U.S. Cl.
CPC ............ *A01M 21/02* (2013.01); *A01D 34/008* (2013.01); *G05D 1/0246* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 10,448,571 B1* | 10/2019 | McFarland | A01G 17/026 |
| 2014/0021267 A1* | 1/2014 | Sudduth | A01C 21/00 239/69 |
| 2017/0034986 A1* | 2/2017 | Koch | A01D 41/127 |

(Continued)

FOREIGN PATENT DOCUMENTS

| | | | | |
|---|---|---|---|---|
| CN | 106912331 A | * | 7/2017 | |
| GB | 2096874 A | * | 10/1982 | A01B 39/18 |

*Primary Examiner* — David P. Merlino
(74) *Attorney, Agent, or Firm* — Daylight Law, P.C.

(57) ABSTRACT

A method for weeding crops includes, at an autonomous machine: recording an image at the front of the autonomous machine; detecting a target plant and calculating an opening location for the target plant longitudinally offset and laterally aligned with the location of the first target plant; driving a weeding module to laterally align with the opening location; tracking the opening location relative to a longitudinal reference position of the weeding module; when the weeding module longitudinally aligns with the first opening location, actuating the blades of the first weeding module to an open position; recording an image proximal to the weeding module; and in response to detecting the blades of the weeding module in the open position: calculating an offset between the opening location and a reference position of the weeding module, based on the image; and updating successive opening locations calculated by the autonomous machine based on the offset.

20 Claims, 3 Drawing Sheets

(56) References Cited

U.S. PATENT DOCUMENTS

| | | | |
|---|---|---|---|
| 2017/0359943 A1* | 12/2017 | Calleija | A62C 37/40 |
| 2018/0153084 A1* | 6/2018 | Calleija | A01B 79/005 |
| 2018/0243772 A1* | 8/2018 | Davis | G05D 1/0278 |
| 2018/0325019 A1* | 11/2018 | Connell | A01C 5/068 |
| 2019/0032305 A1* | 1/2019 | Hageman | E02F 9/2029 |
| 2019/0104722 A1* | 4/2019 | Slaughter | A01B 39/18 |
| 2020/0242754 A1* | 7/2020 | Peters | A01N 25/00 |

\* cited by examiner

METHOD FOR AUTONOMOUSLY WEEDING CROPS IN AN AGRICULTURAL FIELD

CROSS-REFERENCE TO RELATED APPLICATIONS

This Application is a continuation application of U.S. patent application Ser. No. 16/267,362, filed on 4 Feb. 2019, which claims the benefit of U.S. Provisional Application No. 62/626,602, filed on 5 Feb. 2018, both of which are incorporated in their entireties by this reference.

TECHNICAL FIELD

This invention relates generally to the field of agricultural implements and more specifically to a new and useful method for autonomously weeding crops in an agricultural field in the field of agricultural implements.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
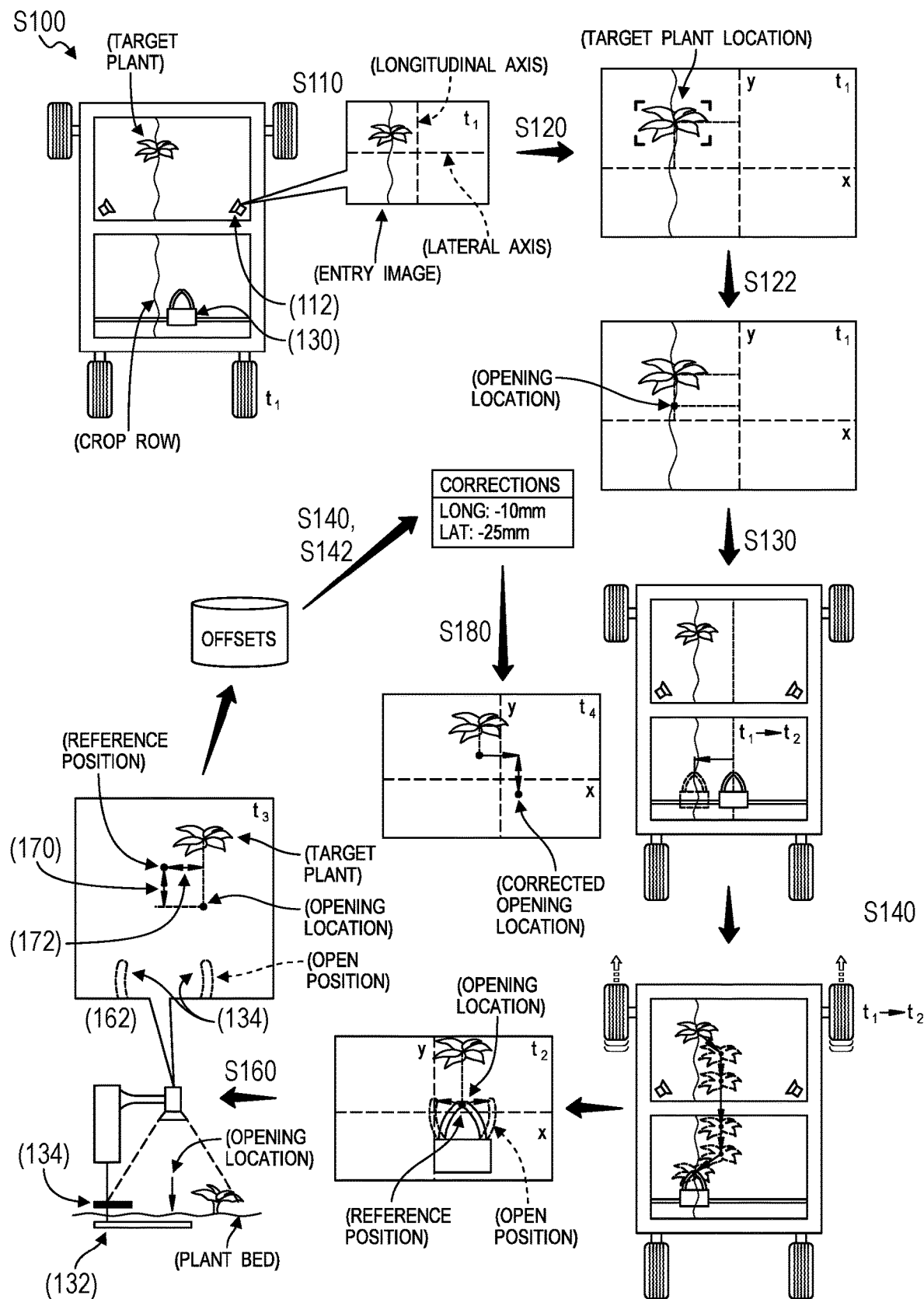
FIG. 1 is a flowchart representation of a first method.

As shown in FIG. 1, a first method S100 for autonomously weeding crops in an agricultural field includes, at an autonomous machine autonomously navigating along crop rows in an agricultural field: recording a first image of a ground area below a light module arranged proximal a front of the autonomous machine in Block S110; detecting a location of a first target plant based on the first image in Block S120; calculating a first opening location for the first target plant longitudinally offset from the location of the first target plant and laterally aligned with the location of the first target plant in Block S122; driving a first weeding module to laterally align a lateral reference position of the first weeding module with the first opening location, the first weeding module arranged in a tool housing behind the light module in Block S130; tracking the first opening location relative to a longitudinal reference position of the first weeding module in Block S140; in response to the longitudinal reference position of the first weeding module longitudinally aligning with the first opening location, actuating the blades of the first weeding module to an open position in Block S150; recording a second image of a ground area below the tool housing in Block S160. The first method S100 also includes, in response to detecting the blades of the first weeding module in the open position in the second image in Block S162: calculating a first longitudinal offset between the first opening location and the longitudinal reference position of the first weeding module, based on the second image in Block S170; and calculating a first lateral offset between the first opening location and the lateral reference position of the first weeding module, based on the second image in Block S172.

The first method S100 can further include: recording a third image of the ground area below the light module in Block S110; detecting a location of a second target plant based on the third image in Block S120; calculating a second opening location for the second target plant longitudinally offset from the location of the second target plant and laterally aligned with the location of the second target plant in Block S122; calculating a corrected second opening location by offsetting the second opening location by the first longitudinal offset and the first lateral offset in Block S180; driving the first weeding module to laterally align the lateral reference position of the first weeding module with the corrected second opening location in Block S130; tracking the corrected second opening location relative to the longitudinal reference position of the first weeding module in Block S140; and, in response to the longitudinal reference position of the first weeding module longitudinally aligning with the corrected second opening location, actuating the blades of the first weeding module to the open position in Block S150; and recording a fourth image of the ground area below the tool housing in Block S160. The first method can further include, in response to detecting the blades of the first weeding module in the open position in the fourth image in Block S162: calculating a second longitudinal offset between the second opening location and the longitudinal reference position of the first weeding module, based on the fourth image in Block S170; and calculating a second lateral offset between the second opening location and the lateral reference position of the first weeding module, based on the fourth image in Block S172. The first method S100 can further include averaging the first longitudinal offset and the second longitudinal offset to calculate a longitudinal correction in Block S190; and averaging the first lateral offset and the second lateral offset to calculate a lateral correction in Block S192.

2. Second Method

Figure 2:
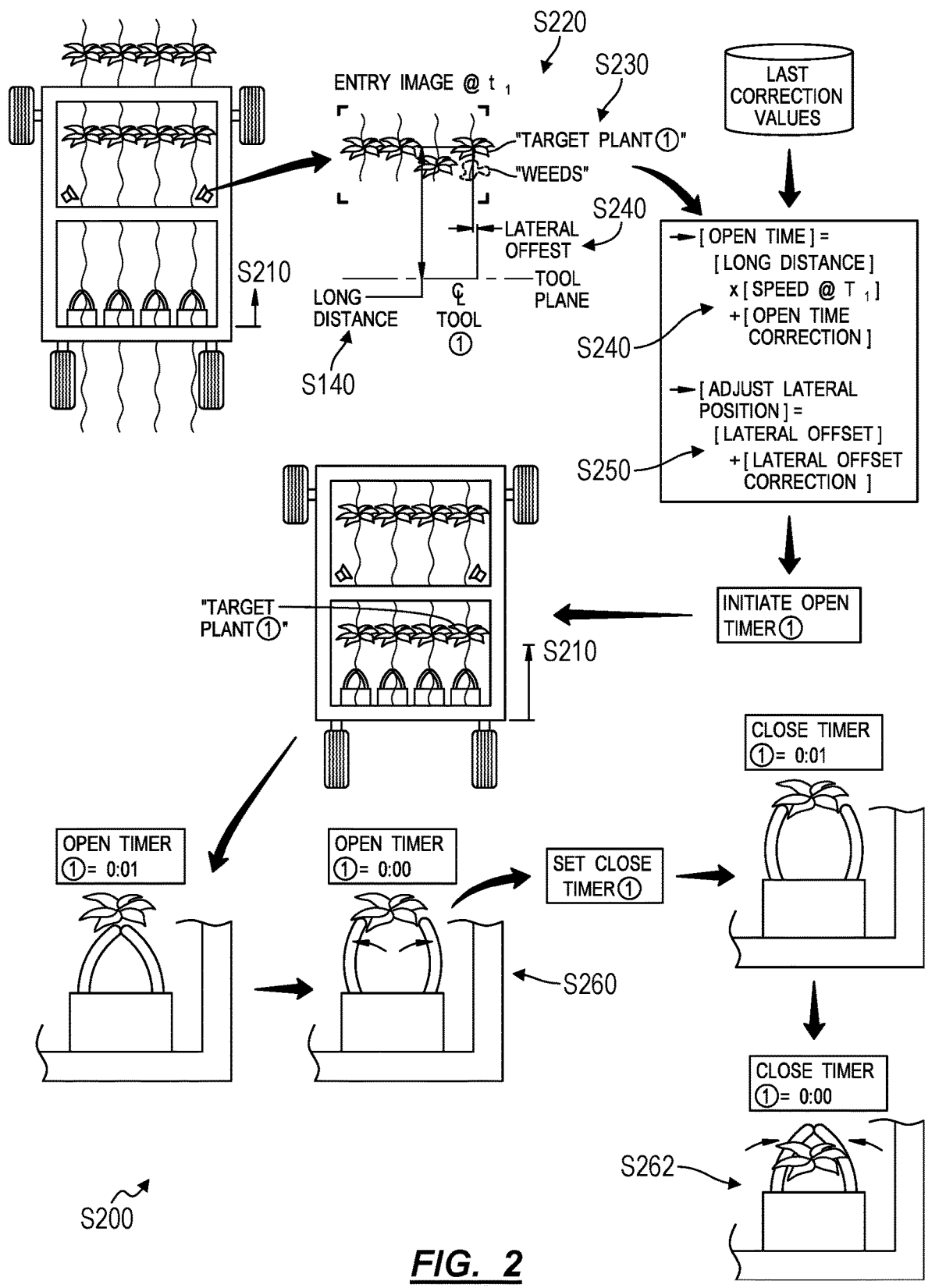
FIG. 2 is a flowchart representation of a second method.

As shown in FIG. 2, a second method S200 for autonomously weeding crops in an agricultural field includes, at an autonomous machine: autonomously navigating along crop rows in an agricultural field in Block S210; at a first time, recording a first image of a ground area in a light module arranged proximal a front of the autonomous machine in Block S220; detecting a first target plant in the first image and determining a first position of a stalk of the first target plant in the first image in Block S230; calculating a longitudinal distance from the first position of the first target plant to tips of closed blades in a weeding module arranged in a tool housing behind the light module, estimating a first duration of time at which the first target plant will reach the longitudinal position of the closed blades of the first weeding module based on the longitudinal distance and a speed of the autonomous machine at the first time, and initiating a timer for a sum of the first duration of time and an open time correction in Block S240; calculating a first lateral offset from the first position of the first target plant at the first time to a lateral center of the first weeding module and driving the first weeding module to a lateral position offset from the lateral center by a sum of the first lateral offset and lateral offset correction in Block S250; in response to expiration of the timer at a second time, triggering blades in the first weeding module to open for an open duration in Block S260;

and, in response to conclusion of the open duration at a third time, triggering blades in the first weeding module to close in Block S262.

Figure 4:
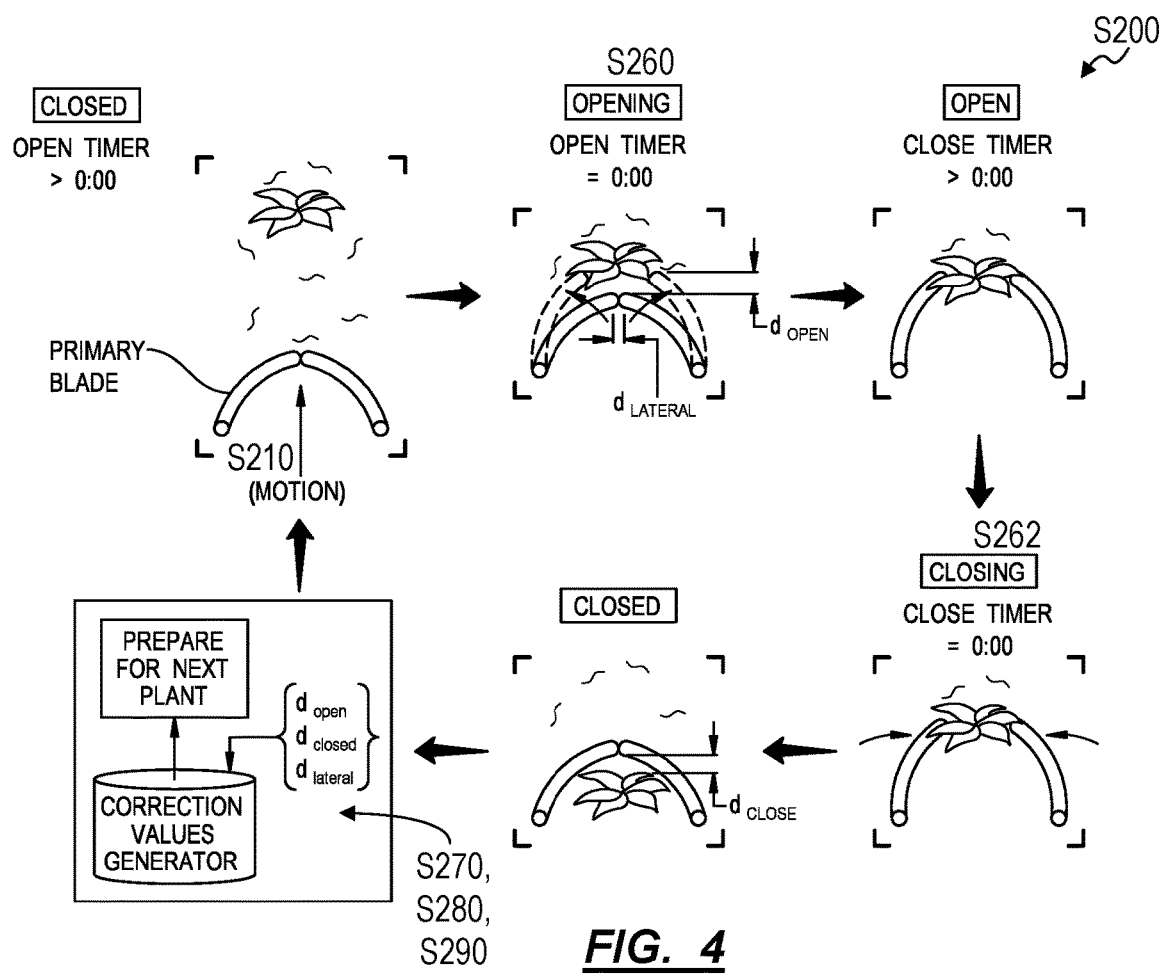
FIG. 4 is a flowchart representation of one variation of the second method.

As shown in FIG. 4, the second method S200 can also include, in Block S270: at approximately the second time, recording a second image of the ground area in the tool housing; detecting the first target plant in the second image; determining a second position of the stalk of the first target plant in the second image; calculating a longitudinal distance from tips of the blades to the stalk of the first target plant in the second image; calculating a longitudinal difference between the longitudinal distance and a target offset open distance; calculating a revised open time correction based on a sum of the open time correction and a product of the longitudinal difference and a speed of the autonomous machine at the second time.

As shown in FIG. 4, the second method S200 can also include, in Block S280: calculating a lateral distance from tips of the blades to the stalk of the first target plant in the second image; and calculating a revised lateral offset correction based on a combination of the lateral offset correction and the lateral distance.

As shown in FIG. 4, the second method S200 can further include, in Block S290: at approximately the third time, recording a third image of the ground area in the tool housing; detecting the first target plant in the third image; determining a third position of the stalk of the first target plant in the third image; calculating a longitudinal distance from tips of the blades to the stalk of the first target plant in the third image; calculating a longitudinal difference between the longitudinal distance and a target offset close distance; calculating a revised close time correction based on a sum of the close time correction and a product of the longitudinal difference and a speed of the autonomous machine at the third time.

3. Applications

Generally, the first method S100 and the second method S200 can be executed by an autonomous farm implement (hereinafter an "autonomous machine") to automatically: navigate along rows of crops in an agricultural field; detect plants as the autonomous machine 100 navigates over these plants; characterize these plants as either target plants (i.e., desired crops) or non-target plants (e.g., weeds); localize the target plants relative to the autonomous machine 100; manipulate actuators within the autonomous machine 100 to selectively disturb non-target plants while leaving target plants substantially undisturbed; monitor accuracy of the actuators during this weeding operation; and to update the localization process based on the monitored accuracy over time.

In particular, the autonomous machine 100 can draw a weeding module 130—in a closed position—along crop rows to disturb and remove weeds from topsoil in the field during a weeding operation. To identify target plants, the autonomous machine 100 can also: record an image (e.g., a color photographic image, a multispectral image, a merged image from multiple front cameras 112, etc.) of a ground area at the front of the autonomous machine 100 as the autonomous machine 100 navigates along crop rows in the agricultural field; detect and distinguish a target plant in the image; determine a location of the target plant relative to the autonomous machine 100; track the location of the target plant relative to the autonomous machine 100; laterally align a weeding module 130 of the autonomous machine 100 to the target plant; and, in response the location of the target plant longitudinally aligning with the weeding module 130, trigger the weeding module 130 to open to avoid the target plant as the weeding module 130 passes the target plant and to close once the weeding module 130 passes the target plant. The autonomous machine 100 can repeat this process as the autonomous machine 100 passes over subsequent target plants in the agricultural field.

When tracking the location of a target plant, the autonomous machine 100 can: monitor actions of the autonomous machine 100 (e.g., changes in the position and or heading of the autonomous machine 100) relative to the target plants and update (e.g., 30 times a second) a coordinate system defining the location of located target plants relative to the autonomous machine 100. Thus, the autonomous machine 100 can continuously actuate its weeding modules 130 to laterally align with the location of the target plant before performing a weeding operation around the target plant (e.g., removing weeds from around the target plant).

The autonomous machine 100 can therefore detect and distinguish target plants from weeds in images recorded by a forward camera arranged near the front of the autonomous machine 100, such as arranged in a light module 110 that consistently illuminates a ground area ahead of a set of weeding modules 130 in the autonomous machine 100. The autonomous machine 100 can also: extract characteristic information from these high-resolution images—such as plant quality, signs of pest pressures, geospatial location, etc.; and calculate positional (or timing) parameters for actions by the set of weeding modules 130 to remove weeds proximal to the target plants well before these target plants reach these weeding modules 1300. By thus offsetting detection and characterization of target plants ahead of interactions with these target plants, the autonomous machine 100 can repeatably and accurately prepare the weeding modules 130 to remove weeds from around these target plants and to clear the target plants (e.g., by laterally centering these weeding modules 130 to upcoming target plants). As the autonomous machine 100 navigates over the agricultural field thereby closing the distance between the target plants and the set of weeding modules 130, the autonomous machine 100 can calculate appropriate opening and closing locations for each target plant; and trigger these weeding modules 130 to open and close at the calculated positions in order to dislodge substantially all weeds around these target plants while leaving these target plants undisturbed. The autonomous machine 100 can also: monitor these interactions between the weeding modules 130 and the target plants; characterize deviations between actual and target results of these interactions; and feed these deviations forward to adjust positional parameters calculated for subsequent target plants approaching these weeding modules 130 in order to maintain a high accuracy in these weeding module 130—target plant interactions.

In one implementation, the autonomous machine 100 can utilize a rear mounted camera attached to each weeding module 130 of the autonomous machine 100 to characterize deviations between the intended position of the weeding module 130 (e.g., the position that aligns with an opening or closing location corresponding to a target plant) and the actual position of the weeding module 130 when performing the weeding operation around a target plant. The weeding module 130 can include fiducials (e.g., blade fiducials 134) located above the soil such that the fiducials are observable to the rear camera 136. The fiducials are also mechanically constrained relative to the blades 132 of the weeding module 130 such that the fiducials move with the blades 132 and therefore indicate whether the blades of the weeding module 130 are open, closed, or in the process of opening or closing. The autonomous machine 100 can then select images recorded by the rear camera 136 based on the position of the fiducials to characterize the degree to which the weeding module 130 was aligned with: the opening location corresponding to a target plant, the closing location corresponding to a target plant, or the location of the target plant itself. The autonomous machine 100 can then calculate, based on these selected images, a longitudinal offset and a lateral offset for each location associated with the target plant (e.g., the opening location, closing location, or actual location of the target plant).

The autonomous machine 100 can average or otherwise summarize the longitudinal and lateral offsets calculated over a recent window of time in order to approximate a longitudinal correction and a lateral correction to apply to the locations of target plants. Thus, the autonomous machine 100 can correct systematic errors in its location detecting, location tracking, and weeding module 130 actuation processes.

The autonomous machine 100 is described below as including weeding modules 130 and executing the methods S100 and S200 to de-weed an agricultural field. However, the autonomous machine 100 can implement similar methods and techniques to prepare and then trigger tool modules of other types—such as seeding, watering, fertilizing, harvesting, and pesticide modules—to apply water or fertilizer to target plants, apply pesticides around these target plants, and/or to deposit seeds in particular locations, etc.

4. Autonomous Machine

Figure 3:
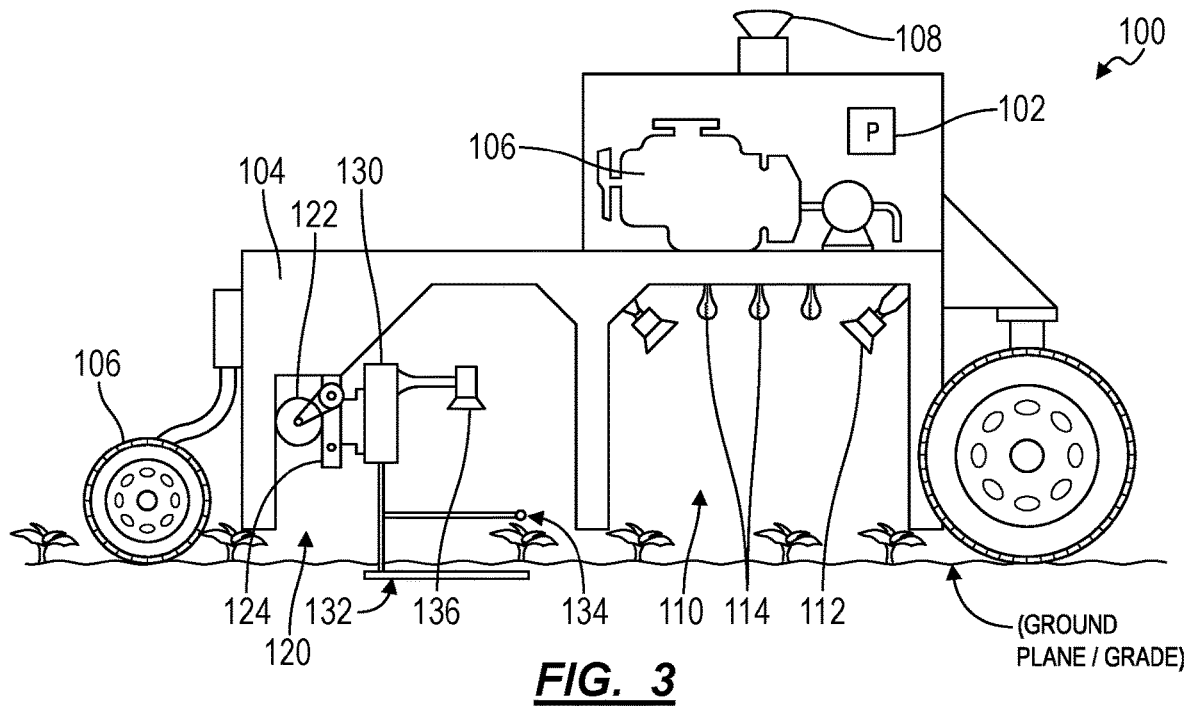
FIG. 3 is a schematic representation of a system.

As shown in FIG. 3, the autonomous machine 100 is configured to autonomously navigate through an agricultural field while detecting target plants in the agricultural field and performing weeding (or other) operations on or around the identified target plants. The autonomous machine 100 can thus define a wheeled or tracked vehicle and can include a controller 102, a chassis 104, and a drive unit 106 configured to propel the autonomous machine 100 forward. The controller 102 is configured to execute either of the methods S100 and S200. The autonomous machine 100 can also include: geospatial position sensors 108 (e.g., GPS) configured to output the autonomous machine's location in space; inertial measurement units configured to output values representing the autonomous machine's trajectory; and/or outwardly facing color and/or depth sensors (e.g., color cameras, LIDAR sensors, and/or structured light cameras, etc.) configured to output images from which the autonomous machine 100 can detect nearby obstacles, localize itself within a scene, and/or contextualize a nearby scene; etc. The autonomous machine 100 can also include an onboard navigation system configured to collect data from the foregoing sensors, to elect next actions, and to adjust positions of various actuators within the autonomous machine 100 to execute these next actions.

The autonomous machine 100 also includes a forward positioned light module 110 and rearward positioned tool housing 120 containing a set of tool modules (e.g., weeding modules 130). The light module 110 is configured to house one or more front cameras 112 while blocking external light from reaching the ground and over exposing any images recorded by the front facing cameras. The tool housing 120 contains one or more laterally mobile tool modules that the autonomous machine 100 can actuate in order to perform weeding or other operations on the target plants.

4.1 Light Module

The autonomous machine 100 can also include a light module 110 arranged proximal the front of the autonomous machine 100. The light module 110 can define an enclosed volume with a downward-facing opening and spanning one or more crop rows. The light module 110 can also include controllable lighting elements 114 configured to repeatably illuminate a ground area directly under the opening of the light module 110. Furthermore, the light module 110 can include retractable or flexible shades (i.e. flaps) that substantially block external ambient light from illuminating the area enclosed within the light module 110.

4.2 Tool Housing

The autonomous machine 100 can further include a tool housing 120 arranged behind the light module 110 and configured to house one or more tool modules, such as described below. The tool housing 120 is configured with a downward-facing opening and defines a volume sufficiently large to enclose the set of tool modules of the autonomous machine 100 and to allow for lateral adjustment of the tool modules in response to variable lateral locations of target plants relative to the autonomous machine 100 as the autonomous machine 100 navigates over a crop row. Thus, the tool modules housed in the tool housing 120 can extend toward target plants via the downward-facing opening in order to perform various agricultural operations described below.

In one implementation, the tool housing 120 includes a tool receptacle 124: configured to transiently receive one of various tool modules; and including a tool positioner 122 configured to shift the tool receptacle 124 laterally within the tool housing 120 in order to laterally align an end effector of a tool module—loaded into the tool receptacle 124—with successive plants in a row of crops over which the autonomous machine 100 passes during operation. For example, the tool housing 120 of the autonomous machine 100 can include four (or six) tool receptacles 124. To autonomously weed a field of crops, each tool receptacle 124 in the autonomous machine 100 can be loaded with a weeding module 1300. As the autonomous machine 100 passes over a field of crops, tool positioners 122 in these tool receptacles 124 can be independently-controlled to laterally align their weeding modules 130 to successive target plants in corresponding rows of crops as these weeding modules 130 selectively upset weeds while rendering target plants (i.e., crops) substantially undisturbed.

Later, to water these crops, the tool receptacles 124 can be loaded with watering tools connected to a common water reservoir installed on the autonomous machine 100. As the autonomous machine 100 navigates along rows of crops, the autonomous machine 100 can: independently control tool positioners 122 in these tool receptacles 124 to laterally align each watering tool to target plants in its corresponding crop row; and selectively trigger each watering tool to dispense water onto target plants in their corresponding crop rows.

Similarly, to fertilize these crops, the tool receptacles 124 can be loaded with fertilizing tools connected to a common fertilizer reservoir installed on the autonomous machine 100. As the autonomous machine 100 navigates along rows of crops, the autonomous machine 100 can: independently control tool positioners 122 in these tool receptacles 124 to laterally align each fertilizing tool to target plants in its corresponding crop row; and selectively trigger each fertilizing tool to dispense fertilizer onto these target plants.

Tool receptacles 124 in the tool housing 120 can be similarly loaded with: fertilizing tools; pesticide/herbicide tools; thinning or culling tools; seeding tools; and/or harvesting tools; etc.

In another implementation, the tool housing 120 can include a lateral support beam to which the various tool modules are mounted. The tool modules can then laterally traverse the lateral support beam in order to align themselves with target plants passing below the tool housing 120. Each tool module mounted to the lateral support beam can be individually electrically connected with the autonomous machine 100 in order to receive positioning and operative instructions in addition to electrical power from the autonomous machine 100. The autonomous machine 100 can therefore direct each tool module to laterally traverse the support beam via a motor included in the tool module and/or tool housing in order to laterally align an end effector of the tool module with a target plant in the agricultural field.

However, the autonomous machine 100 can include any tool housing 120 and/or tool module configuration that enables individual lateral adjustment of the tool modules within the tool housing 120.

4.3 Cameras

The autonomous machine 100 can also include various cameras or other optical sensors arranged inside the light module 110 and inside the tool housing 120 and configured to record images of ground areas passing under the light module 110 and the tool housing 120 as the autonomous machine 100 autonomously navigates along crop rows within an agricultural field.

4.3.1 Front Camera

In one implementation, the autonomous machine 100 includes a front camera 112 (e.g., a high-resolution, high-speed RGB camera or multi-spectral imager) arranged in the light module 110, defining a field of view spanning all or a portion of the opening of the light module 110, and configured to record images (or "entry images") of ground areas entering the light module 110 from the front of the autonomous machine 100 (i.e., ground areas that the autonomous machine 100 is navigating over). The autonomous machine 100 can then analyze these entry images to detect and distinguish crops (or "target plants") from weeds, to calculate positions of stalks of target plants with a relatively high degree of accuracy and repeatability, and/or to extract qualities of these target plants (e.g., plant age, plant size, pest presence, fertilizer burns, nutrient or water deficiency, etc.).

The autonomous machine 100 can also include multiple front cameras 112 in the light module 110. For example, the autonomous machine 100 can include one front camera 112 arranged over each crop row spanned by the light module 110, wherein each front camera 112 is configured to record images of a single crop row. In this example, the autonomous machine 100 can process images from these front cameras 112 independently and control individual tool modules trailing these front cameras 112 accordingly. In another example, the autonomous machine 100 includes two or more cameras arranged in the light module 110 and defining fields of view that span multiple (e.g., two or three) crop rows. The autonomous machine 100 can then: process images output by these cameras independently, as described below; or stitch discrete, concurrent images recorded by these cameras into a composite image of the ground area spanned by the light module 110 and then process this composite image as described below. The autonomous machine 100 can also include multiple cameras in the light module 110 with overlapping fields of view. The autonomous machine 100 can then process concurrent images to obtain depth information for the target plant or any aspect of the agricultural field via binocular machine vision algorithms.

However, the autonomous machine 100 can include any configuration of one or more front cameras 112 such that the autonomous machine 100 can record images for accurate identification, localization, and analysis of target plants.

4.3.2 Rear Cameras

The autonomous machine 100 can also include one or more rear cameras 136 arranged in the tool housing 120. For example, the autonomous machine 100 can include one camera coupled to each tool receptacle 124 in the tool housing 120, wherein each camera faces downward to define a field of view that includes an end effector of a tool module loaded into its corresponding tool receptacle 124 (or that includes a reference feature connected to the end effector and extending above the soil when the end effector is submerged in soil, as described below). In one example, wherein the autonomous machine 100 includes a weeding module 130 as the tool module, the end effector includes a set of weeding blades further described below.

Each of these rear cameras 136 can thus record image data representing interactions between a corresponding tool module and plants passing under the tool housing 120 (e.g., a distance between the tips of weeding blades when the blades open to avoid a target plant and/or a distance between the tips of the blades and the target plant when the blades close after passing over the target plant). In particular, a rear camera 136 can record images of interactions between an end effector—of a tool module loaded into the tool housing 120—and plants passing under the autonomous machine 100 (or "exit images"). Furthermore, since the autonomous machine 100 may analyze optical data recorded by the rear camera(s) 136 to determine relative positions of the end effector or tool modules and plants passing through the tool housing 120 in order to gauge effectiveness of the tool module in executing an action—rather than to extract plant quality and/or other more sophisticated metrics—the rear camera(s) 136 may be of lower resolution or otherwise collect lower-density optical data than the front camera(s) 112, thereby reducing processing time or processing load for the autonomous machine 100 to interpret images recorded by the rear camera(s) 136. However, the rear camera(s) 136 can record images at a frame rate greater than the front camera(s) 112 in order to enable the autonomous machine 100 to detect proximity of the blades 132 to a target plant with a high degree of temporal accuracy and resolution.

Alternatively, the autonomous machine 100 can include an electromechanical trigger configured to electrically trigger the rear camera 136 to record an image in response to a position or change in position of an end effector of a tool module (e.g., a position of the blades 132 of a weeding module). For example, the autonomous machine can include a rear camera 136 that is configured to record an image in response to the blades 132 of the weeding module reaching an open position or a closed position.

In implementations wherein the autonomous machine 100 includes a weeding module 130, the rear camera 136 for the weeding module 130 can be mounted or otherwise affixed to the weeding module 130 such that the center of the field of view of the rear camera 136 substantially aligns with a reference position of the primary weeding blades further described below.

In an alternative implementation wherein the autonomous machine 100 includes other tool modules (e.g., a watering module, fertilizing module, seeding module), the autonomous machine 100 can include a rear camera 136 facing downward with the end effector of the tool module within the field of view of the rear camera 136. Thus, the autonomous machine can include rear camera(s) 136 coupled to the tool module with a field of view encompassing the end effector of the tool module in order capture the particular agricultural function of the tool module.

4.4 Weeding Module

In one variation, a tool receptacle 124 in the tool housing 120 is loaded with a weeding module 1300. Generally, the weeding module 130 is configured to adjust its lateral position relative to the autonomous machine 100 in order to align with target plants as the autonomous machine 100 navigates in the agricultural field. The weeding module 130 also includes a set of blades 132 (e.g., weeding blades), which can be inserted at a predefined depth under the surface of the topsoil. The blades 132 can then selectively disturb weeds around target plants by opening and closing around target plants in the agricultural field. The weeding module 130 can also include a camera mounted directly on the weeding module 130 that is configured to record the position of blade fiducials 134 in order to determine an exact time and/or location of the blades when the blades open or closed. The autonomous machine 100 can then analyze images taken by the camera in order to determine lateral and longitudinal corrections for locating target plants.

In one implementation, the autonomous machine 100 can access the position of a weeding module 130 and, therefore, the position of the blades 132 (e.g., via calibration described below). The weeding module 130 can include encoders on any moving parts of the module or the autonomous machine 100 such that the autonomous machine 100 can access the position of the weeding module 130 within the tool housing 120 at any given time.

4.4.1 Blades and Blade Actuator

In one implementation, the weeding module 130 can include a pair of blades 132 and a blade actuator configured to transition the blades 132 between open and closed positions. In this implementation, the blades 132: can define curved, cantilevered sections extending from driveshafts suspended from the tool receptacle 124; and submerged in topsoil, such as configured to run 0-60 millimeters below grade while the autonomous machine 100 traverses an agricultural field in order to dislodge weeds from topsoil. The blades 132 can also be geared or otherwise driven together by the blade actuator—such as an electromagnetic rotary motor or a pneumatic linear actuator—such that the blades 132 open and close together. Alternatively, the weeding module 130 can include separate actuators and or motors configured to drive each of the blades 132 separately.

In the closed position by default, tips of blades 132 can come into contact or nearly into contact such that the blades 132 form a continuous barricade across the width of the weeding module 130; the blades 132 in the closed position can thus displace topsoil and tear weeds out of the topsoil across the full lateral span of the blades 132 in the closed position. In this implementation, the pair of blades 132 can also be vertically offset relative to one another, thereby enabling the tips of the blades to overlap to ensure a continuous barricade across the width of the weeding module 130 in the closed position.

However, when opened by the blade actuator, tips of the blades 132 spread apart, thereby forming an open region between the tips of the blades 132. The blade actuator can therefore transition the blades 132 to the open position in order to form a gap between the blades 132: sufficient to fully clear the stalk of a target plant passing under the weeding module 130; sufficient to minimally disrupt topsoil around the target plant; but sufficiently closed to dislodge other non-target plants (e.g., weeds) immediately adjacent the target plant from the topsoil as the autonomous machine 100 autonomously navigates past the target plant.

In this implementation, in the open position, the blade actuator can open the blades 132 by a distance matched to a type and/or growth stage of crops in the field. For example, the target open distance between the blades 132 in the open position can be set manually by an operator prior to dispatching the autonomous machine 100 to weed the agricultural field. In this example, the operator can select the target open distance between the tips of the primary blade in the open position from a dropdown menu, such as: 20 mm for lettuce at two weeks from seeding; 30 mm for lettuce at three weeks from seeding; 40 mm for lettuce at four weeks from seeding; and 50 mm spread for lettuce after five weeks from seeding and until harvest. Alternatively, to avoid disrupting a small target plant with shallow roots but to improve weeding accuracy for more mature plants with deeper root structures, the operator can select the target open distance between the tips of the primary blade in the open position of: 50 mm for lettuce at two weeks from seeding; 40 mm for lettuce at three weeks from seeding; 30 mm for lettuce at four weeks from seeding; and 20 mm spread for lettuce after five weeks from seeding and until harvest. Alternatively, the autonomous machine 100 or affiliated support infrastructure can automatically select these distances. The blade actuator can then implement these settings during a next weeding operation at the field, as described below. The driveshafts of the blade actuator can be positioned at a distance greater than the maximum open distance of the blades 132 in order to allow target plants that can pass within the gap formed by the open blades 132 to also pass between the driveshafts of the blade actuator without being substantially disturbed.

Furthermore, the blade actuator can be configured to retain the blades 132 in the closed position by default such that the blades 132 displace topsoil and tear weeds out of the topsoil across the full lateral span of the blades 132 as the autonomous machine 100 navigates along a crop row. However, in this example, upon nearing a target plant the autonomous machine 100 can trigger the blade actuator to open the blades 132 by the target open distance to permit the target plant to pass through the weeding module 130 substantially undisturbed; once the target plant passes, the autonomous machine 100 can trigger the blade actuator to return to the closed position, as described below.

In one implementation, the autonomous machine 100 can configure the weeding module 130 to perform a thinning operation on an agricultural field. In this implementation, the blade actuator can retain the blades 132 in the closed position when passing over target plants that are smaller than a predetermined size as detected by the front camera 112.

The autonomous machine 100 can also define a reference position for the blades 132 of a weeding module 130 that the autonomous machine 100 can use to align the blades 132 of the weeding module 130 with incoming target plants in order to properly clear the target plants when performing the weeding operation. In one implementation, the reference position is located at the intersection point of the blades 132 when the blades 132 are in the closed position. In another implementation, the reference position is located at the lateral center between the two blades 132 when the blades are in the closed position.

4.4.2 Blade Geometry

Furthermore, the blades 132 can curve inwardly toward one another to enable the actuator to transition the blades 132 from the open position to the closed position just as the tips of the blades 132 pass a target plant, thereby causing the blades to come (nearly) into contact just behind the target plant and thus dislodge other plants (e.g., weeds) just behind the target plant. Because the blades are curved inwardly, trailing sections of the blades 132 may remain offset from the target plant—and therefore may not disturb the target plant—when the weeding module 130 rapidly closes the tips of the blades 132 just behind (e.g., just millimeters behind) the stalk of the target plant while also drawing weeds out of the topsoil around the target plant as the autonomous machine 100 advances along a crop row.

For example, weeds may grow predominately around crops, particularly if these crops are selectively watered and fertilized. As the autonomous machine 100 draws the blades 132 near a target plant, the blade actuator can maintain the blades 132 in the closed position in order to upset weeds ahead of the target plant. However, as the tips of the blade approach the target plant, the blade actuator can open the blades 132 to clear the stalk of the target plant; as the tips of the blade pass the target plant, the blade actuator can again close the blades 132 to contact weeds just behind the target plant and to draw these weeds out of the topsoil. In particular, the curvature of the blades 132 can be matched to a normal operating speed (e.g., two miles per hour) of the autonomous machine 100 and to a normal closing speed of the blades 132 when actuated by the blade actuator: such that the tips of the blades 132 come back (nearly) into contact with one another when actuated by the blade actuator (e.g., just as the tips of the blades 132 pass the stalk of the target plant) in order to extricate weeds immediately behind the target plant from the topsoil; and such that the blades 132 remain sufficiently offset from the target plant, thereby rendering the target plant and soil in the immediate vicinity of the target plant substantially undisturbed.

However, the blades 132 can also be configured with other geometries such as straight, outwardly curved, or any more complex geometry.

4.4.3 Blade Fiducials

In one variation, the weeding module 130 also includes a set of blade fiducials 134 (i.e. fiducials) arranged above the blades 132 and configured to visually indicate locations of the tips of the blades 132, which may be submerged in the topsoil and thus visually obscured from the rear camera(s) 136.

In one implementation, the weeding module 130 includes one secondary blade offset above each primary blade, wherein each secondary blade defines a tip (e.g., a color-coded or lighted tip) offset vertically above its corresponding primary blade below. The autonomous machine 100 can thus track positions of tips of the blade fiducials 134—such as relative to target plants passing under the weeding module 130—and determine positions of tips of the blades 132 relative to the target plant accordingly.

Alternatively, the autonomous machine 100 can monitor positions of the tips of the blades 132 directly from outputs of sensors (e.g., optical encoders, limit switches) coupled to driveshafts from which the blades 132 are suspended.

In an alternative variation, the weeding module 130 can include blade fiducials 134 that do not directly indicate the position of the blades 132 of the weeding module 130 (e.g., by occupying the same space within the field of view of the rear camera 136) and instead indicate the current position (i.e. an open position, a closed position, or a transitional position). In this variation, the weeding module 130 can include shorter fiducials that are mechanically constrained to the position of the blades 132.

4.4.4 Fixed Blades

In one variation, the autonomous machine 100 also includes fixed blades extending between blades 132 in adjacent weeding modules 130 in the tool housing 120. These fixed blades can be configured to disturb weeds between crops rows (e.g., in inter-row areas) not handled by the movable blades 132. In another variation, the fixed blades can be mounted to weeding modules in order to laterally align with the outside edges of crop rows and remove weeds in those areas of the agricultural field that are in between the crop rows.

4.4.5 Depth Adjustment

In one variation, the autonomous machine 100 also includes a depth adjuster configured to adjust a depth of the blades 132 of the weeding module 130 in the topsoil. For example, the autonomous machine 100 can: estimate a distance from a reference point on the autonomous machine 100 to topsoil under the autonomous machine 100, such as with a separate depth sensor arranged in the tool housing 120; and implement closed-loop controls to actuate the depth adjuster to raise or lower the blades 132 substantially in real-time in order to maintain a consistent depth of the blades 132 below the local surface of the topsoil based on this distance to the topsoil.

Alternatively, the chassis 104 of the autonomous machine 100 can be suspended on an adjustable-height suspension, and the autonomous machine 100 can adjust the depth of blades 132 in the topsoil by adjusting the height of the chassis 104 during operation.

In yet another alternative implementation, each weeding module 130 can rest on the surface of the topsoil on a set of wheels configured to suspend the weight of the weeding module 130 above them via a suspension system. The weight of the weeding module 130 can then press the blades 132 to an adjustable depth (adjustable by adjusting the suspension) below the level of the wheels as they roll over the surface of the topsoil. Thus, the suspension of the weeding module 130 itself regulates the depth of the blades 132 under the topsoil. Furthermore, the autonomous machine 100 can adjust the spring rate and/or damping of the suspension automatically according to properties of the target plants and/or weeds in the agricultural field. Alternatively, a user of the autonomous machine can adjust the spring rate and/or damping of the suspension of the weeding module 130 in order to achieve a consistent depth of the blades 132 under the topsoil of the agricultural field.

Yet alternatively, the depth of the blades 132 can be set manually and then fixed when the weeding module 130 is loaded into a tool receptacle 124 in the tool housing 120.

5. Rear Camera Calibration

In one implementation, the autonomous machine 100 can calibrate the position of a rear camera 136 fixed to a weeding module 130 relative to the reference position of the blades 132 (e.g., the blade reference position) of the same weeding module 1300. This calibration process determines the pixel location of the reference position of the blades 132 such that the autonomous machine 100 can accurately measure offsets between intended locations of the blades 132 and actual locations of the blades 132 during weeding operation. Furthermore, the autonomous machine 100 can also determine positions of the blade fiducials 134 within the field of view of the rear camera 136 that correspond with the open position of the blades 132 and the closed position of the blades 132.

In this implementation, the autonomous machine 100 can display a field of view of the rear camera 136 and provide a diagnostic interface (e.g., via a built-in diagnostic monitor or via a monitor connected with the autonomous machine 100) for an operator of the autonomous machine 100 to input the pixel location of the blade reference position. Additionally, the diagnostic interface enables the operator of the autonomous machine 100 to specify a position of the blade fiducials 134 corresponding to an open position of the blades 132 and corresponding to a closed position of the blades 132.

In an alternative implementation, the autonomous machine 100 performs the calibration process autonomously by: drawing the blades 132 out of the topsoil such that the blades 132 are directly visible by the rear camera 136; locating (e.g., via computer vision algorithms) a reference position of the blades 132, such as by detecting the pixel location of the intersection point between the blades 132; detecting a closed position of the blade fiducials 134 corresponding to a closed position of the blades 132; actuating the blades 132 to an open position; and detecting an open position of the blade fiducials 134 corresponding to an open position of the blades 132. The autonomous machine 100 can perform the calibration process multiple times successively in order to obtain an average or tolerance window for the reference position of the blades 132, the closed position of the blade fiducials 134, and the open position of the blade fiducials 134.

In yet another alternative, the autonomous machine can correlate the location of the blade fiducials 134 with the position of the blades 132 autonomously by: actuating the blades 132 to a closed position; recording successive images of the blade fiducials 134 as the autonomous machine navigates across the agricultural field; generating a difference image of the successive images to locate the position of the blade fiducials 134 within the field of view of the rear camera 136 when the blades are in the closed position; actuating the blades 132 to an open position; recording successive images of the blade fiducials 134 as the autonomous machine navigates across the agricultural field; and generating a difference image of the successive images to locate the position of the blade fiducials 134 within the field of view of the rear camera 136 when the blades are in the open position.

However, the autonomous machine 100 can detect or otherwise obtain (e.g., via demarcation by an operator of the autonomous machine 100) the pixel location of the blade reference position, the closed position of the blade fiducials 134, and the open position of the blade fiducials 134 within the field of view of the rear camera 136.

6. Weeding Operation

When dispatched to an agricultural field to perform a weeding operation, the autonomous machine 100 can execute Blocks of the methods S100 or S200 to: autonomously navigate along crop rows in the agricultural field; to detect and track target plants; and to selectively actuate the weeding modules 130 to dislodge plants other than target plants from the topsoil.

In particular, the methods S100 and S200 are described below as executed by the autonomous machine 100 when loaded with a weeding module 1300. For the autonomous machine 100 that includes multiple tool receptacles 124, each loaded within a weeding module 130, the autonomous machine 100 can execute multiple instances of the method S100 or of the method S200 for each of the weeding modules 130 loaded in the autonomous machine 100 in order: to detect target plants in multiple discrete crop rows; to independently reposition these weeding modules 130 into lateral alignment with target plants in their corresponding crop rows; and to selectively trigger their blade actuators to open and close in order to upset weeds while leaving target plants in these rows substantially undisturbed.

6.1 Navigation

In one implementation, the autonomous machine 100: includes a set of geospatial position sensors 108 (e.g., GPS sensors); and tracks its absolute position and orientation within a geospatial coordinate system based on outputs of these geospatial position sensors 108. In preparation for a weeding operation within an agricultural field, the perimeter or vertices of the agricultural field can be defined within the geospatial coordinate system and then loaded onto the autonomous machine 100. The longitudinal direction and lateral offset of crop rows in this agricultural field, start and stop locations (e.g., within the geospatial coordinate system), a target ground speed, positions of known obstacles in the agricultural field and other relevant data can be similarly loaded onto the autonomous machine 100.

Once the autonomous machine 100 is dispatched to this agricultural field and once a weeding cycle by the autonomous machine 100 is subsequently initiated by an operator (e.g., locally or remotely), the autonomous machine 100 can: navigate to the specified start location (e.g., around rather than through the georeferenced boundary of the agricultural field); orient itself into alignment with the longitudinal direction of a first set of crop rows at the start location; and accelerate to the target ground speed parallel to the first set of crop rows. While traversing the set of crop rows, the autonomous machine 100 can: record images of target plants within the light module 110 in Block S110; detect locations of target plants in Block S120; and interpolate crop rows between sequential target plants in this first set of crop rows. The autonomous machine 100 can then implement closed-loop controls to veer left or veer right in order to maintain the first set of crop rows approximately centered within the width of the autonomous machine 100. The autonomous machine 100 can additionally or alternatively detect crop rows through images recorded by outwardly-facing cameras on the front of the autonomous machine 100 and align itself to these crop rows accordingly.

Upon reaching the georeferenced boundary of the agricultural field, the autonomous machine 100 can autonomously execute a reverse-offset maneuver to turn 180° and align itself with a second set of crop rows—adjacent and offset from the first set of crop rows by an effective width of the tool housing 120 (e.g., by four crop rows for the tool housing 120 loaded with four weeding modules 130). For example, the autonomous machine 100 can execute a U-turn maneuver responsive to both GPS triggers and optical features indicative of the end of the crop row in images recorded by various cameras in the autonomous machine 100. The autonomous machine 100 can again: accelerate to the target ground speed parallel to the second set of crop rows; maintain the second set of crop rows centered within the width of the autonomous machine 100; and repeat the reverse-offset maneuver to align itself with a third set of crop rows upon reaching the opposing georeferenced boundary of the agricultural field. The autonomous machine 100 can repeat these processes until the autonomous machine 100 has traversed the entirety of the specified area of the agricultural field, then autonomously navigate back to a stop location, and finally enter a standby mode.

However, the autonomous machine 100 can implement any other method or technique to track its location and orientation, to autonomously navigate across an agricultural field, and to maintain itself in alignment with rows of crops during a weeding operation.

6.2 Plant Detection and Identification

While navigating along the row of crops, the autonomous machine 100 can regularly record entry images through one or more forward cameras (e.g., RGB color or multispectral cameras) arranged in the light module 110, such as at a rate of 24 Hz, in Block S110 of the first method and Block S220 of the second method. Upon receipt of a first entry image recorded by the forward camera(s) at a first time, the autonomous machine 100 can implement computer vision techniques to: detect and extract features in the first entry image; and to identify these features are representing target plants, weeds, soil, or other non-target matter in Block S120 of the first method and Block S230 of the second method. For example, the autonomous machine 100 can implement template matching, object recognition, or other plant classifier or computer vision techniques to detect plant matter in the first entry image and to distinguish a first target plant from weeds in the first entry image (e.g., based on plant color(s), leaf shape, and/or size, etc.). The autonomous machine 100 can additionally or alternatively implement deep learning techniques (e.g., convolutional neural networks) to identify target plants in an entry image.

Once the autonomous machine 100 identifies a target plant in the first entry image, the autonomous machine 100 can also approximate or otherwise locate a stalk (or meristem) of the target plant. For example, the autonomous machine 100 can: calculate a centroid of foliage of the target plant and associate this centroid as the location of the stalk of the first target plant. Once the autonomous machine 100 determines the location of the stalk of the first target plant—such as in the first entry image or relative to a reference point on the autonomous machine 100—the autonomous machine 100 can: store this location of the stalk of the first target plant as a "first position" of the first target plant at a first time; and associate the first target plant with a first tool receptacle 124 in the tool housing 120 in response to the first position of the first target plant falling within a range of lateral positions corresponding to the first tool receptacle 124. For example, for the tool housing 120 that includes four tool receptacles 124, each loaded with a weeding module 130, the autonomous machine 100 can associate the first target plant with a first, rightmost weeding module 130 in the tool housing 120 if the first position of the first target plant falls within a right 25% of the light module 110.

In an alternative implementation, the autonomous machine 100 can identify and associate each plant row over which the autonomous machine 100 is navigating with a particular weeding module 130. The autonomous machine 100 can then associate plants within each identified plant row with the weeding module 130 that has been assigned to that plant row. The autonomous machine 100 can reevaluate the relative position of each plant row periodically (e.g., after every five target plants in the plant row).

However, the autonomous machine 100 can implement any other method or technique to detect and distinguish a target plant from other organic matter represented in the first entry image and to determine a position of the stalk of the plant in the first entry image.

6.3 Weeding Operation Alternatives

As described above, the autonomous machine 100 can maintain the blades 132 in the closed position by default in order to upset all non-target plants in the path of the blades 132 as the autonomous machine 100 navigates along a row of crops while opening the blades 132 to avoid disturbing the target plants. However, the autonomous machine 100 can execute two methods to accomplish the above task. The autonomous machine 100 can execute the first method S100 by tracking the spatial location of the target plants and operating the blades of the weeding module 130 according to the spatial alignment of the target plants with the blades 132 of the weeding module 1300. Alternatively, the autonomous machine 100 can execute the second method S200 to estimate a time at which the target plant will align with the blades 132 of the weeding module 130 and then operate the blades at that time. Each of these methods are described further below.

The initial Blocks of the first method S100 and the second method S200 are substantially similar as described above. For example, both methods involve navigating along crop rows in an agricultural field; recording entry images of target plants in the agricultural field in Blocks S110 and S220 respectively; and detecting a target plant in the entry images of the agricultural field in Blocks S120 and S220. However, each of the methods involves the execution of different Blocks in order to accurately align the blades 132 of the weeding module 130 with the detected target plants.

6.4 Spatial Weeding Operation

The autonomous machine 100 can execute the first method S100 to: calculate an opening location corresponding to a detected target plant in Block S130; track the location of a target plant in a machine-relative spatial coordinate system in Block S140; actuate the blades of the weeding module 130 in response to alignment between the location of the target plant and the blades of the weeding module 130 in Block S150; and calculate lateral and longitudinal offsets for the weeding operation in Blocks S160, S162, S170 and S172. Thus, the autonomous machine 100 can continually track the spatial accuracy of the weeding operation to remove weeds from areas surrounding the target plant without disturbing the target plant.

6.4.1 Target Plant Location Detection

Once the autonomous machine 100 identifies a target plant in the first entry image in Block S120, the autonomous machine 100 can: identify a pixel location approximating the position of the stalk of the target plant; extract the pixel location of the first target plant in first entry image; map the extracted pixel location to a pixel projection of the target plant; calculate a lateral and longitudinal location of the target plant relative to the autonomous machine 100 based on the depth of topsoil surface below the front camera 112.

The autonomous machine 100 identifies a pixel location approximating a location of a stalk of the target plant within the field of view of the camera at the time the image was recorded. For example, the autonomous machine 100 can calculate a centroid of the set of pixels identified as the target plant. Alternatively, the autonomous machine 100 can perform additional computer vision techniques to approximate the pixel location of the stem from the set of pixels identified as the target plant. The autonomous machine 100 can then extract the coordinates of the identified pixel.

The autonomous machine 100 can then calculate a pixel projection (e.g., a ray incident to the lens of the front camera), corresponding to the extracted pixel coordinates. The calculated pixel projection therefore corresponds to an estimated heading, in three-dimensional space, of the stalk of the target plant relative to the front camera 112. The autonomous machine 100 can store a mapping of each pixel location in the field of view of the camera to a pixel projection corresponding to that pixel. Alternatively, the autonomous machine 100 can include a parametric model, which takes in pixel coordinates and outputs the pixel projection corresponding to the pixel coordinates based on the optical properties of the front camera 112.

The autonomous machine 100 can store the pixel projection corresponding to the pixel representing a target plant using any suitable mathematical description (e.g., projective coordinates, vector descriptions, linear functions, etc.). The autonomous machine 100 can also store an origin of a pixel projection in three-dimensional space.

In order to estimate the location of the target plant along the pixel projection corresponding to the pixel representing the target plant, the autonomous machine 100 can estimate the depth of the plant bed at the location of the target plant. In one implementation, the autonomous machine 100 references a depth sensor located within the light module 110 to estimate the depth of the plant bed relative to the front camera 112 of the autonomous machine 100. Additionally or alternatively, in implementations with at least two front cameras 112, the autonomous machine 100 can estimate the depth of the plant bed using binocular vision techniques (e.g., by comparing the pixel location of plant in two overlapping images). In yet another implementation, the autonomous machine 100 can estimate the depth of the plant bed based on the extension of the weeding modules 130 toward the plant bed.

Once the location coordinates of the target plant have been estimated, the autonomous machine 100 can laterally align an end effector of a tool module to perform an agricultural function, such as weeding at or immediately around the target plant, such as in Block S130. The autonomous machine 100 can also calculate opening and closing locations based on the location coordinates of the target plants in Block S122 further described below.

However, the autonomous machine 100 can implement any other method for estimating a lateral and/or longitudinal location of the target plant and can represent any relevant location in any convenient coordinate system (e.g., global, relative to the autonomous machine 100, relative to the boundaries of the agricultural field).

6.4.2 Opening and Closing Location Calculation

After the autonomous machine 100 has calculated a location of the target plant (i.e. a location of a stalk of the target plant), the autonomous machine 100 can calculate an opening location for the target plant and a closing location for the target plant in Block S122. The opening location is a location in the coordinate system defined relative to the autonomous machine 100 that is a short distance in front of the target plant such that when the autonomous machine 100 actuates the blades of the weeding module 130 into an open position at the opening location, the blades of the weeding module 130 substantially avoid disturbing the target plant while still removing weeds proximal to the target plant. More specifically, the opening location is longitudinally offset from the location of the target plant and laterally aligned with the location of the target plant. The closing location is a location in the coordinate system defined relative to the autonomous machine 100 that is a short distance behind the target plant such that when the autonomous machine 100 actuates the blades of the weeding module 130 into a closed position at the closing location the blades of the weeding module 130 close just behind the target plant without disturbing the target plant.

In one implementation, the autonomous machine 100 calculates the opening location and the closing location based on an opening distance and a closing distance respectively. The opening distance defines the longitudinal offset between the location of the target plant and the opening location, and the closing distance defines the longitudinal offset between the target plant and the closing location. In one implementation, the autonomous machine 100 provides an interface for an operator to adjust the opening and/or closing distance. Alternatively, the autonomous machine 100 can: provide an interface for an operator to specify particular properties of the plants in the agricultural field and/or properties of the crop row, such as plant age, plant size, soil density; and calculate an opening and/or closing location based on the parameters specified by the operator. For example, the autonomous machine 100 can access a lookup table for opening distances and/or closing distances corresponding to each combination of plant age, plant size, and soil density. In yet another implementation, the autonomous machine 100 can: collect weeding operation data over a period of time; calculate opening distances and/or closing distances for a variety of observable parameters; and automatically calculate opening distances and/or closing distances based on the characteristics of the target plant as detected in an entry image.

In one implementation, the autonomous machine 100 can define the opening distance and closing distance to be equal such that the location of the target plant is centered between the opening location for the target plant and the closing location of the target plant.

6.4.3 Location Tracking

The autonomous machine 100 tracks the location of the target plant, the opening location corresponding to a target plant, and/or the closing location corresponding to a target plant in two-dimensional space (or three-dimensional space) relative to the autonomous machine 100 based on changes in the global position and orientation of the autonomous machine 100, such that the autonomous machine 100 can: laterally align the blades 132 of the weeding module 130 to the target plant at the time the weeding module 130 reaches the target plant as in Block S130; the longitudinal location of the target plant can be tracked as in Block S140; and longitudinal alignment between the blades of the weeding module 130 and the opening location corresponding to the target plant can be detected as in Block S150.

The autonomous machine 100 can recalculate the location of each target plant or other relevant location relative to the autonomous machine 100 periodically (e.g., 30 times a second) based on the last or most accurately calculated location for the target plant (e.g., from amongst a number of entry images). Each instance in which the autonomous machine 100 recalculates the relative locations is hereinafter referred to as a "frame." After calculating the various tracked locations related to target plants, the autonomous vehicle tracks its change in global position and/or its change in global orientation since the most recent frame. The autonomous machine 100 can then apply spatial transformations (e.g., rotations and/or translations) to the coordinates defining the tracked locations and generate a new set of locations based on the result of the spatial transformations. In this manner, the autonomous machine 100 repeatedly updates the tracked locations relative to the autonomous machine 100.

In one implementation, the autonomous machine 100 can simultaneously track the location of multiple target plants in several crop rows (e.g. four or six), utilizing the method described above to estimate the location of each target plant. In one implementation, the autonomous machine 100 stores the estimated location of each target plant in a matrix. The autonomous machine 100 can represent the location of a target plant in any suitable coordinate system (e.g. cartesian, spherical, cylindrical). The autonomous machine 100 can utilize image tracking techniques to track each target plant between successive images and update the location estimate corresponding to each target plant accordingly.

In one implementation, the autonomous machine 100 can record successive images of the plant bed while the target plant passes underneath the light module 110, thereby continuously updating the pixel projection corresponding to the pixel representing the target plant. Therefore, the autonomous machine 100 can continue updating the location of the target plant until the tool modules reach the target plant. Concurrent with each update to the target plant's location, the autonomous machine 100 can actuate the corresponding tool module to laterally align with each updated location as further described below.

Therefore, the autonomous machine 100 can update the location of each target plant represented in the location matrix based on the most recently recorded image of each target plant. Thus, even when a target plant is out of view of the front camera 112, the autonomous machine 100 can use the last location of the target plant to track the target plant.

The autonomous machine 100 can also track or access the relative location of a reference position corresponding to each weeding module 130 (e.g., to the tips of the blades 132 of the weeding module 130). The autonomous machine 100 can access linear, rotational, or any other form of encoder to detect the location of a weeding module 130 relative to the autonomous machine 100. The autonomous machine 100 can also access the location of each rear camera 136 relative to the autonomous machine 100 in order to calculate locations and/or distances associated with target plants based on images from the rear camera(s) 136.

6.4.4 Weeding Module Positioning

After the autonomous machine 100 calculates a location of a target plant based on an entry image, the autonomous machine 100 tracks the location of the target plant relative to the autonomous machine 100, as described above. Thus, the autonomous machine 100 can drive a first weeding module 130 to laterally align the reference position of the first weeding module 130 with the first opening location, the first weeding module 130 arranged in a tool housing 120 behind the light module 110 in Block S130. More specifically, the autonomous machine 100 can execute closed loop controls to match a lateral coordinate of the reference position of the weeding module 130 (corresponding to the position of the blades 132 of the weeding module 130) to the most recent tracked lateral location of the target plant or opening location by laterally actuating the weeding module 130 within the tool housing 120. In this manner, the autonomous machine 100 can continuously actuate the weeding module 130 within the tool module from when the autonomous machine 100 initially detects a target plant until a time at which an opening location for the target plant is longitudinally aligned with the weeding module 130.

When tracking multiple successive target plants within the same crop row, the autonomous machine 100 can laterally align with the target plant immediately in front of the weeding module 130 until the weeding module 130 has performed a weeding operation around the target plant. Once the autonomous machine 100 closes the blades of the weeding module 130 behind the target plant, the autonomous machine 100 can actuate the weeding module 130 to laterally align with the next plant in the crop row.

6.4.5 Primary Blade Operation

Upon laterally aligning a reference position of the weeding module 130 with an opening location corresponding to a target plant, the autonomous machine 100 tracks the opening location relative to a longitudinal coordinate of the reference position (e.g. a longitudinal reference position) of the first weeding module 130 in Block S140; and in response to the longitudinal reference position of the first weeding module 130 longitudinally aligning with the first opening location, actuating the blades of the first weeding module 130 to an open position in Block S150. More specifically, the autonomous machine 100 opens the blades of the weeding module 130 that is laterally aligned with the target plant when the blades of the weeding module 130 are in a previously-calculated opening location for the target plant. Thus, the autonomous machine 100 can successfully avoid disturbing the target plant by opening the blades of the weeding module 130 at the correct lateral and longitudinal location while still removing weeds around and closely proximal to the target plant.

6.4.6 Interaction Image Acquisition

During the weeding operation, the autonomous machine 100 records a series of images capturing interactions between the blades of the weeding module 130 and the target plant in order to correct errors in the location detection, tracking, and actuation of the autonomous machine 100. More specifically, the autonomous machine 100 executes a visual-spatial feedback system by: recording one or more images of the ground below the tool housing 120 via a rear camera 136 in Block S160; and in response to detecting the blades of the first weeding module 130 in the open position in the second image in Block S162: calculating offsets between the reference position of the blades of the weeding module 130 and the opening location and/or closing location corresponding to a target plant. Thus, the autonomous machine 100 visually detects (e.g., via the rear camera 136) the actual offset between the reference position of the blades of the weeding module 130 and opening location corresponding to target plants at a time when the offset between the reference location and the opening locations should be equal to zero according to the detection, tracking, and actuation steps described above.

Therefore, in order to calculate the actual offset between the reference position of the blades of the weeding module 130 and an opening position corresponding to a target plant, the autonomous machine 100 can detect the first image, from amongst a sequence of exit images recorded by the rear camera 136, in which the blades have reached an open position while approximately aligned with an opening location corresponding to a target plant. More specifically, the autonomous machine 100 can: record a sequence of exit images of the ground area below the tool housing 120, the sequence of images comprising an interaction image; sequentially analyze the sequence of images; and, in response to detecting the blades of the weeding module 130 in the open position in the interaction image as the first instance of the blades being open in the sequence of images, select the interaction image from the sequence of images. Thus, the autonomous machine 100 selects a first image, in the sequence of images recorded by the rear camera 136, in which the blades of the weeding module 130 have reached the open position with which to calculate the actual offsets between the blades of the weeding module 130 and an opening position corresponding to a target plant.

In one implementation, the autonomous machine 100 can visually detect that the blades of the weeding module 130 are in the opening position by detecting a position of blade fiducials 134 of the first weeding module 130 in the second image; and, in response to the position of the blade fiducials 134 of the first weeding module 130 in the second image indicating the open position, detect blades of the first weeding module 130 in the open position. The autonomous machine 100 can perform this analysis by comparing the position of the blade fiducials 134 in each image record by the rear camera 136 with the open position of the blade fiducials 134 determined during the calibration process described above. If, in an image, the blade fiducials 134 of the weeding module 130 are within a threshold range of the open position of the blade fiducials 134 (e.g., the blade fiducials 134 occupy a substantially similar area of the field of view of the rear camera 136 to the calibrated position of the blade fiducials 134 that corresponds to an open position of the blade fiducials 134), then the autonomous machine 100 can detect that the blades of the weeding module 130 are in the open position and select the image as the interaction image.

In alternative implementations, the autonomous machine 100 can select the interaction image in other ways. For example, the autonomous machine 100 can include an electrical-mechanical trigger that activates when the blades of the weeding module 130 reach the open position. Therefore, the autonomous machine 100 can select an image recorded by the rear camera 136 of the weeding module 130 at substantially the same time that the electrical mechanical trigger was activated as the interaction image.

The autonomous machine 100 can also record and analyze interaction images corresponding to closing the blades of the weeding module 130 when the reference position of the weeding module 130 is approximately aligned with a closing location corresponding to a target plant. The autonomous machine 100 can thus implement the process described above with reference to an opening location corresponding to a target plant and an open position of the blades of the weeding module 130 and instead: select an interaction image in a sequence of exit images recorded by the rear camera 136 wherein the blades of the weeding module 130 are in a closed position after the autonomous machine 100 has longitudinally aligned with a closing location corresponding to a target plant.

In implementations wherein the autonomous machine 100 is loaded with other tool modules, the autonomous machine 100 can select interaction images in a similar manner. For example, the autonomous machine 100 can: detect the position of a fiducial mechanically linked to an end effector of a tool module; and select an interaction image from a sequence of exit images based on the detected position of the fiducial.

6.4.7 Offset Detection

Upon selecting an interaction image depicting the blades of the weeding module 130 opening (or closing) proximal a target plant, the autonomous machine 100 can detect longitudinal and lateral offsets between a reference position of the blades of the weeding module 130 and the opening or closing location as depicted in the interaction image in Blocks S170 and S172. For example, if the interaction image depicts the blades of a weeding module 130 opening at the opening location (although the blades may not be visible in the image since they are located under a layer of topsoil), the autonomous machine 100 can calculate a longitudinal and lateral offset between the reference position of the blades based on the interaction image and the opening location based on the interaction image. In another example, if the interaction image depicts the blades of a weeding module 130 closing at the closing location, then the autonomous machine 100 can calculate a longitudinal and lateral offset between the reference position of the blades based on the interaction image and the closing location based on the interaction image. Thus, the autonomous machine 100 can: detect a target plant in the interaction image; calculate a location of the opening location of the target plant based on the interaction image; and calculate an offset between the opening location and the reference position of the blades in the interaction image.

More specifically, the autonomous machine 100 can: detect a pixel location of a target plant in the interaction image; calculate a pixel location of the opening location corresponding to the target plant based on the pixel location of the target plant in the interaction image; calculate a longitudinal offset between the opening location and the longitudinal reference position of the weeding module 130 based on the pixel location of the opening location and the pixel location of the longitudinal reference position (e.g., which may be set in the calibration process for the rear camera 136) in the interaction image; calculate a lateral offset between the opening location and the lateral reference position of the weeding module 130 based on the pixel location of the opening location and the pixel location of the lateral reference position (e.g., which may be determined in the calibration process for the rear camera 136) in the interaction image. The autonomous machine 100 can perform the abovementioned calculations by executing computer vision techniques based on optical properties of the rear camera 136, the orientation of the rear camera 136, and the depth of the plant bed below the rear camera 136.

In one implementation, the autonomous machine 100 identifies a pixel location of a target plant (which corresponds with an estimated actual location of the target plant) in the interaction image by matching features in the interaction image with an entry image of the same target plant. Thus, the autonomous machine 100 can: generate a first set of visual features of an entry image; detect a target plant in the entry image; track the target plant; actuate a weeding module 130 to laterally align with the target plant; upon identifying an interaction image for the target plant, generating a second set of visual features for the interaction image; map the first set of visual features to the second set of visual features; and detect an estimated pixel location of the first target plant based on the set of like features. The autonomous machine 100 can then calculate an estimated opening location and/or a closing location based on the image. By detecting the target plant in the interaction image via feature mapping with an entry image of the same plant, the autonomous machine 100 can detect the target plant more quickly (i.e. with less computational power) thereby improving detection time for a target plant in an interaction image and allowing for quicker calculation of longitudinal and lateral offsets.

Upon calculating the longitudinal offset and lateral offset, the autonomous machine 100 can store the offset values, and any metadata associated with the target plant for which the offset values were calculated (e.g., the pixel location within the field of view of the front camera 112 with which the location of the target plant was calculated, the lateral location of the target plant relative to the central axis of the autonomous vehicle, the ambient temperature proximal the autonomous machine 100, etc.). The autonomous machine 100 can then input the stored offset values into a correction model further described below.

6.4.8 Correction Model

The autonomous machine 100 executes a correction model based on calculated offset values within a recency window or buffer in order to correct for errors in calibration, location detection, tracking, and actuation of the weeding module 130 in Blocks S190 and S192. As the autonomous machine 100 navigates the agricultural field, the autonomous machine 100 identifies target plants, and performs weeding operations around target plants thereby detecting, calculating, and storing longitudinal offsets and lateral offsets for each detected target plant, as described with reference to Blocks S110, S120, S122, S130, S140, S150, S160, S162, S170, and S172. The autonomous machine 100 can then input a subset of the stored offset values (e.g., a buffer of the last 10, 100, 1000, etc. offset values) into a correction model to calculate a longitudinal correction and a lateral correction for successive tracked locations in the agricultural field.

In one implementation, the autonomous machine 100 executes a correction model that outputs a running average of the offset values within the recency window. Additionally or alternatively, the autonomous machine 100 can implement a correction model that calculates a separate running average for various regions of the field of view of the front camera 112 in which the target plant was initially detected. For example, upon detecting a target plant in a first region of the field of view of the front camera(s) 112 and performing a weeding operation around the target plant, the autonomous machine 100 can categorize the offset values calculated in relation to the target plant based on the detection region in order to apply more accurate longitudinal corrections and lateral corrections to locations tracked by the autonomous machine 10000. In one implementation, the detection regions can be laterally divided sections of the field of view of the front camera 112.

In another implementation, the autonomous machine 100 executes a machine learning model trained on the offset data and the metadata associated with each offset data point. The autonomous machine 100 can train the machine learning model to predict a longitudinal correction and a lateral correction for any location calculated by the autonomous machine 100 (e.g., target plant locations, opening locations, closing locations, etc.) based on metadata associated with the location. The metadata can include any number of parameters characterizing the target plant or the condition of the autonomous machine 100 and/or the agricultural field, such as soil density, ambient temperature, region of the camera field of view within which a target plant was initially detected, and the speed of the autonomous machine 100 etc. Based on metadata measured or accessed in relation to a target plant, the correction model can output a longitudinal correction and a lateral correction for a location of the target plant and/or opening or closing locations associated therewith.

However, the autonomous machine 100 can calculate a longitudinal correction and a lateral correction based on calculated offsets between the reference position of the weeding module 130 and various locations tracked by the autonomous machine 100 in any other way.

6.4.9 Location Correction

Upon calculating a longitudinal correction and/or a lateral correction, the autonomous machine 100 can apply the corrections to locations calculated in Blocks S120 and S122 in real-time. For example, the autonomous machine 100 can record longitudinal offsets and lateral offsets while executing a weeding operation on a first target plant and apply corrections based on the recorded offsets when calculating the location of the subsequent target plant. The autonomous machine 100 can therefore: calculate a corrected opening location by offsetting the opening location by a longitudinal correction and a lateral correction in Block S180. In one implementation, the autonomous machine 100 can calculate the corrected location of a target plant by offsetting a calculated location of a target plant by both the longitudinal correction and the lateral correction. Alternatively, the autonomous machine 100 can apply the corrections when calculating opening and closing locations for an uncorrected location of a target plant. Thus, when calculating an opening location for a target plant and/or a closing location for a target plant, the autonomous machine 100 can offset the initially calculated opening location or closing location by the longitudinal correction and the lateral correction.

6.5 Temporal Weeding Operation

The autonomous machine 100 can execute the second method S200 to: autonomously navigate along crop rows in an agricultural field in Block S210; record an entry image of a ground area at the front of the autonomous machine 100 in Block S220; detect a target plant in the entry image in Block S230; calculate a longitudinal distance from the first position of the first target plant to tips of closed blades 132 in a weeding module 130 arranged in a tool housing 120 behind the light module 110, estimating a first duration of time at which the first target plant will reach the longitudinal position of the closed blades 132 of the first weeding module 130 based on the longitudinal distance and a speed of the autonomous machine 100 at the first time, and initiating a timer for a sum of the first duration of time and an open time correction in Block S240; calculate a first lateral offset from the first position of the first target plant at the first time to a lateral center of the first weeding module 130 and driving the first weeding module 130 a lateral position offset from the lateral center by a sum of the first lateral offset and lateral offset correction in Block S250; in response to expiration of the timer at a second time, trigger blades 132 in the first weeding module 130 to open for an open duration in Block S260; and, in response to conclusion of the open duration at a third time, trigger blades 132 in the first weeding module 130 to close in Block S262. Thus, the autonomous machine 100 can temporally control the weeding operation to remove weeds from areas surrounding the target plant without disturbing the target plant.

6.5.1 Plant Time and Lateral Position Prediction

Once the autonomous machine 100 detects a target plant and the location of its stalk in the first entry image, the autonomous machine 100 can predict: a time that target plant will reach a corresponding weeding module 130 based on a speed of the autonomous machine 100 and a longitudinal position of the target plant in the first entry image in Block S240; and a lateral position of the weeding module 130 that will permit the blades 132 of the weeding module 130 to clear the target plant when in the open position based on a lateral position of target plant in the first entry image in Block S250.

In one implementation, the autonomous machine 100 calculates its real ground velocity from a most-recent sequence of GPS locations and orientations read from GPS sensors in the autonomous machine 100. Alternatively, the autonomous machine 100 can calculate the velocity of a target plant—relative to the autonomous machine 100—based on changes in the detected position of the target plant over a sequence of entry images recorded by the forward camera(s) as the target plant passes through the light module 110. Yet alternatively, the autonomous machine 100 can determine its velocity relative to the ground—and therefore relative to a target plant—based on its wheel speed and wheel position; and/or based on dead reckoning to interpret outputs of an IMU arranged in the autonomous machine 100.

The autonomous machine 100 can then: calculate a longitudinal distance from the first position of the first target plant to tips of the blades 132—in the closed position—at the first time, such as based on a known position of the first weeding module 130 in the first tool receptacle 124 relative to the light module 110; and then divide this longitudinal distance by a current speed of the autonomous machine 100 to calculate a first estimate of a duration of time—from the current time—at which the first target plant will reach the longitudinal position of the closed blades 132 of the first weeding module 130 in Block S240. The autonomous machine 100 can also calculate a first lateral offset from the first position of the first target plant at the first time to a lateral center (or "home position") of the first weeding module 130 in Block S250, as shown in FIG. 2. (The autonomous machine 100 can also implement this process continuously to estimate this duration of time.)

In a similar implementation, the autonomous machine 100 can: define a reference tool plane coincident tips of the blades 132 in the closed position and parallel to the front plane of the autonomous machine 100; extrapolate an arc traversed by the first target plant—relative to the autonomous machine 100—from the first position at the first time to a reference plane based on the current trajectory of the autonomous machine 100; calculate a length of the arc; and estimate a future time at which the first target plant will reach the reference tool plane (and therefore reach the blades 132 of the first weeding module 130) based on the velocity of the autonomous machine 100. The system can also calculate a first lateral offset from: an intersection of the arc and the reference tool plane; and an intersection of the reference tool plane and a longitudinal axis passing through the lateral center of the first weeding module 130.

The autonomous machine 100 can then: sum the first time estimate with an open time correction—described below—to calculate an adjusted open time; sum the first lateral offset with a lateral offset correction—described below—to calculate an adjusted lateral offset; initiate an open timer for this adjusted open time; and trigger the tool positioner 122 in the first tool receptacle 124 to drive the first weeding module 130 laterally to the adjusted lateral offset.

Furthermore, the autonomous machine 100 can modify the adjusted open time based on a change in velocity of the autonomous machine 100 since the last time estimate was calculated. More specifically, the autonomous machine 100 can modify the adjusted open time based on a change in speed of a weeding module 130 relative to a next target plant, which may be a function of (a change in) the velocity of the autonomous machine 100 in the longitudinal direction, (a change in) the angular velocity of the autonomous machine 100, and a position of the weeding module 130 inside the autonomous machine 100. Similarly, the autonomous machine 100 can modify the adjusted lateral offset based on a change in position of the autonomous machine 100 since the last lateral offset was calculated. More specifically, the autonomous machine 100 can modify the adjusted lateral offset based on a change in position of a weeding module 130 relative to a next target plant, which may be a function of the angular velocity of the autonomous machine 100 over this period of time and a position of the weeding module 130 inside the autonomous machine 100.

6.5.2 Plant Time and Lateral Position Revision

In one variation, the system can repeat the foregoing Blocks of the second method S200 and techniques to recalculate the time estimate for arrival of the first target plant at the plane of the first weeding module 130 in Block S240 and to recalculate the lateral offset from the first target plant to the centerline of the first weeding module 130 in Block S250 when the first target plant is detected in subsequent entry images recorded by the forward camera(s).

For example, the forward camera can regularly record color entry images of a ground area bounded by the light module 110 at a rate of 24 Hz. Upon receipt of a second entry image—following the first entry image—from the forward camera at a second time, the autonomous machine 100 can implement object tracking techniques to again detect the first target plant—now at a second position within the light module 110—in this second entry image. The autonomous machine 100 can then repeat the foregoing processes to: calculate a revised estimate of a future time at which the first target plant will reach the longitudinal position of the closed blades 132 of the first weeding module 130; and calculate a revised lateral offset for the first weeding module 130 based on a difference between the second position of the first target plant at the second time and the lateral center of the first weeding module 130. The autonomous machine 100 can then: confirm that the current and preceding time estimates of lateral offsets are converging; apply the open time correction to the revised time estimate; reset the open timer to the corrected revised time estimate; apply the lateral offset correction to the revised lateral offset; and trigger the tool positioner 122 in the first tool receptacle 124 to move the first weeding module 130 to this revised, adjusted lateral position.

The autonomous machine 100 can continue to implement this process based on entry images recorded by the forward camera(s) until the first target plant exits the light module 110.

6.5.3 Target Plant Avoidance

When the open timer expires, the autonomous machine 100 can: trigger the blade actuator in the first weeding module 130 to open the blades 132 in Block S260, thereby permitting the stalk of the first target plant and adjacent topsoil to pass through the gap between the blades 132 substantially undisturbed; and set a close timer for a corrected close duration (e.g., a sum of default close duration and a close time correction, described below). Once the close timer expires, the autonomous machine 100 can trigger the blade actuator in the first weeding module 130 to close the blades 132 in Block S262, thereby bringing the tips of the blades 132 back into (near) contact just aft of the first target plant and enabling the blades 132 to upend weeds immediately behind the first target plant without upsetting the first target plant itself, as shown in FIGS. 2 and 4.

6.5.4 Primary Blade Interaction Tracking

As the first target plant enters the tool housing 120 and approaches the first weeding module 130, the autonomous machine 100 triggers the blade actuator in the first weeding module 130 to open and close the blades 132 responsive to expiration of the open and close timers, respectively. Before, during, and/or after this actuation of the blades 132, a rear camera 136 over the first weeding module 130 can record a sequences of exit images (e.g., a "burst" of exit images). The autonomous machine 100 can then implement methods and techniques similar to those described above to detect a first target plant (e.g., a stalk of the first target plant) in these exit images and to estimate a location of the stalk of the first target plant accordingly.

The autonomous machine 100 can also detect and track positions of the blade fiducials 134 or other physical fiducials coupled to blades 132 in this sequence of exit images and track the positions of the blades 132 accordingly, as described above.

The autonomous machine 100 can then: extract a lateral distance from a centerline between the blades 132 and the center of the stalk of the first target plant from an exit image recorded by the rear camera 136 at or just before the autonomous machine 100 triggered the blade actuator to open the blades 132 in the first weeding module 130 (e.g., at or just before the open timer expires at a second time); subtract the first lateral offset—currently occupied by the first weeding module 130—from the lateral distance to calculate a new lateral offset correction; and then store this new lateral offset correction for implementation by the first weeding module 130 for a next target plant passing through the first weeding module 130 in Block S280. Alternatively, the autonomous machine 100 can compare these exit images to identify a first exit image that depicts initial opening of the blades 132 and implement similar processes to a new lateral offset correction from this first exit image. (Once the first target plant passes the first weeding module 130 and before the next target plant reaches the first weeding module 130, the autonomous machine 100 can adjust the lateral position of the first weeding module 130 according to the new lateral offset correction.)

The autonomous machine 100 can similarly: calculate longitudinal distance from tips of the blades 132 to the center of the stalk of the first target plant as the blades 132 approach the first target plant and at or just before the autonomous machine 100 triggers the blade actuator to open the blades 132 (e.g., at or just before the open timer expires at the second time); and calculate a difference between this longitudinal distance and a predefined target longitudinal offset for opening the blades 132 prior to reaching a target plant. For example, the predefined target longitudinal offset can be selected based on: a size or age of the crop being weeded (e.g., a larger predefined target longitudinal offset for larger or older plants); a type of topsoil (e.g., larger predefined target longitudinal offset for rockier soil); or dampness of the topsoil (e.g., larger predefined target longitudinal offset for wetter topsoil); etc. The autonomous machine 100 can then calculate a revised open time correction for a next target plant to pass through the first weeding module 130 in Block S270 by: multiplying this difference by a speed of the autonomous machine 100 at the second time; and subtracting from this product the open time correction implemented for the current (i.e., the first) target plant.

Similarly, the autonomous machine 100 can calculate a longitudinal distance from tips of the blades 132 to the center of the stalk of the first target plant as or just before the autonomous machine 100 triggers the blade actuator to close the blades 132 (e.g., at or just before the close timer expires at a third time). The autonomous machine 100 can then: calculate a difference between this longitudinal distance and a predefined target longitudinal offset for closing the blades 132 after passing a target plant; and calculate a revised close time correction for the next target plant to pass through the first weeding module 130 in Block S290 by dividing this difference by a speed of the autonomous machine 100 at the third time and subtracting from this product the close time correction implemented for the current (i.e., the first) target plant.

6.5.5 Next Plant in the First Crop Row

As the autonomous machine 100 navigates along crop rows in the agricultural field and as target plants enter the light module 110 and are detected in entry images, the autonomous machine 100 can repeat the foregoing processes to revise lateral offset correction, open time correction, and close time correction values implemented by the autonomous machine 100 for each subsequent target plant based on interaction between the weeding module 130 and preceding target plants. In particular, the autonomous machine 100 can implement closed-loop techniques to feed time and lateral positioning measurements—recorded during actuation of the weeding module 130 to remove weed around a first target plant—forward to adjust an open time, a close timer, and a lateral position for the weeding module 130 for a next target plant to enter the tool housing 120 behind the first target plant; and so on until the autonomous machine 100 completes the weeding operation over the row of crops or the entire agricultural field.

6.6 Other Crop Rows

Furthermore, the autonomous machine 100 can execute multiple instances of the foregoing Blocks of the methods S100 or S200 in parallel: to detect target plants approaching other weeding modules 130—installed in the tool housing 120—substantially concurrently; to drive the weeding modules 130 to their lateral offset positions substantially simultaneously; and to trigger blade actuators in the weeding modules 130 to open their corresponding blades 132 independently upon expiration of their corresponding open timers; and to calculate new corrections—in the corresponding crop rows—entering the tool housing 120. In one implementation, the autonomous machine 100 can include a single rear camera 136 capable of recording interaction images for multiple tool modules in the tool housing 120 in order to reduce the number of rear cameras 136 included in the autonomous machine 100.

6.7 Other Operations

The autonomous machine 100 can implement similar methods and techniques to set timers for actuating tool modules of other types, to set lateral positions of these tool modules for passing target plants, and to thus control actuation of these tool modules in order to selectively address target plants and non-target plants (e.g., weeds) in an agricultural field. For example, the autonomous machine 100 can implement the foregoing methods and techniques to: laterally align a fertilizing head in a fertilizer module to a next target plant in a crop row; dispense fertilizer from the fertilizer module directly onto or in the immediate vicinity of the next target plant; record exit images to detect offsets; and apply corrections to improve subsequent fertilizing operations.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for performing an agricultural operation in an agricultural field comprises, at a machine moving along crop rows in the agricultural field:
    recording a first image of a ground area below the machine;

detecting a location of a first target plant based on the first image;

tracking the location of the first target plant relative to a reference position of a first tool module;

in response to the reference position of the first tool module longitudinally aligning with the location of the first target plant, actuating the first tool module to perform the agricultural operation;

recording a second image of a ground area below the machine; and based on detecting a performance of the agricultural operation in the second image, calculating an offset between the location of the first target plant and the reference position of the first tool module, based on the second image.

2. The method of claim 1, wherein calculating the offset between the location of the first target plant and the reference position of the first tool module based on the second image further comprises, in response to detecting a fiducial of the first tool module in the second image, the fiducial indicating the performance of the agricultural operation, calculating the offset between the location of the first target plant and the reference position of the first tool module based on the second image.

3. The method of claim 1, wherein calculating the offset between the location of the first target plant and the reference position of the first tool module based on the second image further comprises:

calculating a first longitudinal offset between the location of the first target plant and the reference position of the first tool module, based on the second image; and calculating a first lateral offset between the location of the first target plant and the reference position of the first tool module, based on the second image.

4. The method of claim 1, further comprising:

recording a third image of the ground area below the machine;

detecting a location of a second target plant based on the third image;

calculating a corrected location of the second target plant by offsetting the location of the second target plant by the offset;

driving the first tool module to laterally align the reference position of the first tool module with the corrected location of the second target plant; and in response to the reference position of the first tool module longitudinally aligning with the corrected location of the second target plant, actuating the first tool module to perform the agricultural operation.

5. The method of claim 1:

wherein actuating the first tool module to perform the agricultural operation further comprises actuating the first tool module to perform a weeding operation; and wherein calculating the offset between the location of the first target plant and the reference position of the first tool module further comprises, in response to detecting a fiducial of the first tool module in an open position in the second image, the fiducial mechanically constrained relative to blades of the first tool module and indicating the performance of the weeding operation, calculating the offset between the location of the first target plant and the reference position of the first tool module.

6. A method for performing an agricultural operation in an agricultural field comprises, at a machine moving along crop rows in the agricultural field:

recording a first image of a ground area below the machine;

detecting a location of a first target plant based on the first image;

in response to a reference position of a first tool module longitudinally aligning with the location of the first target plant, actuating the first tool module to perform the agricultural operation on the first target plant;

recording a second image of the ground area below the machine;

based on detecting a first performance of the agricultural operation in the second image, calculating a first offset between the location of the first target plant and the reference position of the first tool module, based on the second image;

recording a third image of the ground area below the machine;

detecting a location of a second target plant based on the third image;

calculating a corrected location of the second target plant by offsetting the location of the second target plant by the first offset;

driving the first tool module to laterally align the reference position of the first tool module with the corrected location of the second target plant; and in response to the reference position of the first tool module longitudinally aligning with the corrected location of the second target plant, actuating the first tool module to perform the agricultural operation on the second target plant.

7. The method of claim 6:

wherein actuating the first tool module to perform the agricultural operation on the first target plant further comprises actuating the first tool module to perform a weeding operation on the first target plant;

wherein calculating the first offset between the location of the first target plant and the reference position of the first tool module further comprises, in response to detecting a fiducial of the first tool module in the second image, the fiducial mechanically constrained relative to blades of the first tool module and indicating a performance of the weeding operation; and wherein actuating the first tool module to perform the agricultural operation on the second target plant further comprises actuating the first tool module to perform the weeding operation on the second target plant.

8. The method of claim 6, further comprising:

recording a fourth image of the ground area below the machine; and in response to detecting a second performance of the agricultural operation in the second image, calculating a second offset between the location of the second target plant and the reference position of the first tool module, based on the second image.

9. The method of claim 8, further comprising:

averaging the first offset and the second offset to calculate a correction;

recording a fifth image of the ground area below the machine;

detecting a location of a third target plant based on the fifth image;

calculating a corrected location of the third target plant by offsetting the location of the third target plant by the correction;

driving the first tool module to laterally align the reference position of the first tool module with the corrected location of the third target plant; and in response to the reference position of the first tool module longitudinally aligning with the corrected location of the third target plant, actuating the first tool module to perform the agricultural operation on the third target plant.

10. The method of claim 6, wherein recording the second image of the ground area below the machine comprises recording the second image of the ground area below the machine via a first rear camera mounted to the first tool module.

11. The method of claim 6:

further comprising generating a first set of visual features of the first image; and wherein calculating the first offset between the location of the first target plant and the reference position of the first tool module, based on the second image further comprises:

generating a second set of visual features of the second image;

mapping the first set of visual features to the second set of visual features to generate a set of like features in the second image;

detecting an estimated location of the first target plant in the second image based on the set of like features between the first set of visual features and the second set of visual features; and calculating the first offset between the estimated location of the first target plant and the reference position of the first tool module, based on the estimated location of the first target plant.

12. A method for performing an agricultural operation in an agricultural field comprises, at a machine navigating along crop rows in the agricultural field:

recording a first image of a ground area below the machine using at least one imager arranged towards a front of the machine;

detecting a pixel location of a first target plant based on the first image;

extracting the pixel location of the first target plant from the first image;

mapping the extracted pixel location to a pixel projection of the first target plant;

recording an additional set of successive images of the first target plant using the at least one imager while the target plant passes underneath the at least one imager;

continuously updating the pixel projection using the additional set of successive images to obtain an updated pixel projection corresponding to the first target plant;

longitudinally navigating in the agricultural field to longitudinally align a reference position of a first tool module with a location of the first target plant, the first tool module arranged on a toolbar in a tool housing of the machine, wherein the tool housing is a rearward positioned tool housing;

tracking the location of the first target plant relative to the reference position of the first tool module using the updated pixel projection; and in response to the reference position of the first tool module longitudinally aligning with the location of the first target plant, actuating the first tool module to perform the agricultural operation.

13. The method of claim 12, wherein actuating the first tool module to perform the agricultural operation further comprises actuating the first tool module to perform a weeding operation.

14. The method of claim 13, wherein actuating the first tool module to perform the weeding operation further comprises, in response to the reference position of the first tool module aligning with an opening location longitudinally offset in advance of the location of the first target plant, actuating blades of the first tool module to an open position.

15. The method of claim 14 further comprising, in response to the reference position of the first tool module longitudinally aligning with a closing location longitudinally offset behind the location of the first target plant, actuating blades of the first tool module to a closed position.

16. The method of claim 12, wherein actuating the first tool module to perform the agricultural operation further comprises actuating the first tool module to perform a fertilizing operation.

17. The method of claim 12, wherein actuating the first tool module to perform the agricultural operation further comprises actuating the first tool module to perform a pesticide application operation.

18. The method of claim 12, further comprising:

detecting a location of a second target plant based on the first image;

driving a second tool module along the toolbar to laterally align a lateral reference position of the second tool module with the location of the second target plant, the second tool module arranged on the toolbar in the tool housing;

tracking the location of the second target plant relative to a longitudinal reference position of the second tool module; and in response to the longitudinal reference position of the second tool module longitudinally aligning with the location of the second target plant, actuating the second tool module to perform the agricultural operation.

19. The method of claim 12, wherein recording the first image of the ground area below the machine further comprises recording the first image of the ground area below a light module arranged proximal the front of the machine via a front camera mounted to a chassis of the machine within the light module.

20. The method of claim 12, wherein tracking the location of the first target plant relative to the reference position of the first tool module further comprises:

tracking a motion of the machine relative to the agricultural field; and transforming the location of the first target plant based on the motion of the machine relative to the agricultural field.

* * * * *

UNITED STATES PATENT AND TRADEMARK OFFICE
CERTIFICATE OF CORRECTION

PATENT NO. : 11,596,139 B2
APPLICATION NO. : 16/570878
DATED : March 7, 2023
INVENTOR(S) : Thomas Palomares et al.

It is certified that error appears in the above-identified patent and that said Letters Patent is hereby corrected as shown below:

In the Claims

Column 31, Claim 12, Line 48, before "target", insert --first--

Signed and Sealed this
Sixteenth Day of May, 2023

Katherine Kelly Vidal
*Director of the United States Patent and Trademark Office*